United States Patent [19]

Izumi et al.

[11] 4,418,126
[45] Nov. 29, 1983

[54] MAGNETIC RECORDING MEDIUM

[75] Inventors: Toshiaki Izumi; Yasuta Taketomi; Takayoshi Kobuke, all of Tokyo, Japan

[73] Assignee: TDK Electronics Co., Ltd., Tokyo, Japan

[21] Appl. No.: 283,548

[22] Filed: Jul. 15, 1981

[30] Foreign Application Priority Data

Jul. 28, 1980 [JP] Japan ................................ 55-103405

[51] Int. Cl.³ .............................................. G11B 5/70
[52] U.S. Cl. .................................... 428/694; 427/128; 427/132; 360/134; 360/135; 360/136; 428/692; 428/900
[58] Field of Search ............... 428/694, 695, 692, 900; 427/128, 132; 360/134–136

[56] References Cited

U.S. PATENT DOCUMENTS 3,116,159 12/1963 Fisher et al. ........................ 427/132
4,250,225 2/1981 Shirahata et al. ................... 427/132

FOREIGN PATENT DOCUMENTS 2506210 9/1975 Fed. Rep. of Germany ...... 427/128
1427731 3/1976 United Kingdom ................ 427/128

OTHER PUBLICATIONS

Bajorek et al., IBM Technical Disclosure Bulletin, vol. 21, No. 10 (Mar. 1979), pp. 4239–4240.

Primary Examiner—Ellis P. Robinson
Attorney, Agent, or Firm—Oblon, Fisher, Spivak, McClelland & Maier

[57] ABSTRACT

A magnetic recording medium comprises a thin metallic magnetic layer on a non-magnetic substrate wherein said thin metallic magnetic layer is made of cobalt, nickel and chromium.

2 Claims, 3 Drawing Figures

MAGNETIC RECORDING MEDIUM

BACKGROUND OF THE INVENTION

1. Field of the Invention

The present invention relates to a thin metallic layer type magnetic recording medium suitable for high density magnetic recording.

2. Description of the Prior Arts

Recently, high density magnetic recording technology has been especially developed because of improvements of a recording and reproducing system, a running system and a magnetic head of a magnetic recording apparatus and a magnetic recording medium. Among them, the requirement for high density magnetic recording in magnetic recording media has been attained mainly by an increase of a coercive force and an increase of a residual magnetic flux density to reduce a thickness of the magnetic recording medium. However, in the conventional magnetic recording media prepared by using a magnetic powder and an organic binder, it has been also impossible to increase the residual magnetic flux density over 3,000–4,000 gauss. Thus, the improvement of the magnetic recording density is limited. Thus, a thin metallic layer type magnetic recording media prepared without any organic binder have been considered to be important. The thin metallic layer type magnetic recording media have been prepared by forming a thin metallic layer on a substrate by forming metallic particles made of a metal or alloy of iron group element or an alloy thereof with a third element by a vacuum evaporation. sputtering, ion-plating, ion beam evaporation or electrochemical method and depositing the metallic particles on the non-magnetic substrate. Among these methods, the vacuum evaporation method has been especially developed as the technology for preparing uniform, long magnetic recording media in an industrial scale.

It has been known that the characteristic of the thin magnetic layer formed by the vacuum evaporation method is mainly dependent upon the magnetic characteristics thereof. In order to attain high recording density, it has been required to have high coercive force.

The following methods have been proposed to increase a coercive force in the vacuum evaporation method.

(a) a tilt deposition;
(b) a deposition in a magnetic field;
(c) a control by a selection of a material for a base; and
(d) a crystalline growth by a heat treatment.

Among these methods, the most effective practical method is the tilt deposition process disclosed in Japanese Examined Patent Publication No. 19389/1966. In this process, as shown in FIG. 1, a thin metallic layer is formed by a tilt deposition of a metallic particles (1) at a tilt angle $\theta$ to the normal line (3) on a surface of a substrate (2). This is especially advantageous method in the inventors' experiments. In the tilt deposition, the thin magnetic layer can be formed as a cobalt-nickel type alloy thin magnetic layer, because of excellent magnetic characteristics thereof. In the tilt deposition, however, it is required to reduce the tilt angle $\theta$ so as to increase the deposition efficiency. The effect of the tilt deposition is reduced by lowering the tilt angle $\theta$. Therefore, the conventional cobalt-nickel type alloy thin magnetic layer has not been satisfactory in the practical purpose.

SUMMARY OF THE INVENTION

It is an object of the present invention to provide a magnetic recording medium having superior magnetic characteristics by a tilt deposition.

The foregoing and other objects of the present invention have been attained by providing a magnetic recording medium having a thin metallic magnetic layer on a non-magnetic substrate wherein the thin magnetic layer is made of cobalt-nickel-chromium alloy.

DETAILED DESCRIPTION OF THE PREFERRED EMBODIMENTS

The cobalt-nickel type alloy thin magnetic layer has been considered to be effective in a practical use because of excellent magnetic characteristics thereof. It has been studied to further improve magnetic characteristics of the cobalt-nickel type alloy thin magnetic layer. As a result, it has been found that a magnetic recording medium having superior magnetic characteristics is obtained by a deposition of cobalt and nickel as main component and chromium as an additional component. When chromium is incorporated at a ratio of up to 5 atomic percent especially 0.5 to 5 atomic percent based on total of cobalt and nickel, the magnetic characteristics are remarkably improved.

The substrate, the deposition process and the other conditions for the thin metallic magnetic layer type magnetic recording medium are described in many patent and patent applications filed by the applicants. These descriptions are referred except the modification of the kind of the alloys for the magnetic layer.

The present invention will be illustrated by certain examples and references which are provided for purposes of illustration only and are not intended to be limiting the invention.

EXAMPLE 1

In a vacuum evaporation apparatus, a vacuum evaporation by electron beam was carried out. A residual magnetization was varied under controlling a running speed of a non-magnetic substrate of polyethyleneterephthalate tape having a thickness of $20\mu$ at a tilt angle $\theta$ of 60 degree under a reduced pressure of about $5 \times 10^{-5}$ Torr. A cobalt-nickel-chromium alloy (atomic ratio of Co:Ni:Cr of 90:10:4) was used as an evaporation base material. The resulting magnetic recording media are referred to as Sample $A_1$.

REFERENCE 1

In accordance with the process of Example 1 except using a cobalt-nickel alloy (atomic ratio of Co:Ni of 9:1) as an evaporation base material, magnetic recording media were prepared. They are referred to as Sample $B_1$.

EXAMPLE 2

In accordance with the process of Example 1 except using a cobalt-nickel-chromium alloy (atomic ratio of Co:Ni:Cr of 80:20:4) as an evaporation base material, magnetic recording media were prepared. They are referred to as Sample $A_2$.

REFERENCE 2

In accordance with the process of Example 1 except using a cobalt-nickel alloy (atomic ratio of Co:Ni of 8:2) as an evaporation base material, magnetic recording media were prepared. They are referred to as Sample $B_2$.

EXAMPLE 3

In accordance with the process of Example 1 except using a cobalt-nickel-chromium alloy (atomic ratio of Co:Ni:Cr of 70:30:4) as an evaporation base material, magnetic recording media were prepared. They are referred to as Sample $A_3$.

REFERENCE 3

In accordance with the process of Example 3 except using a cobalt-nickel alloy (atomic ratio of Co:Ni of 7:3) as an evaporation base material, magnetic recording media were prepared. They are referred to as Sample $B_3$.

Figure 1:
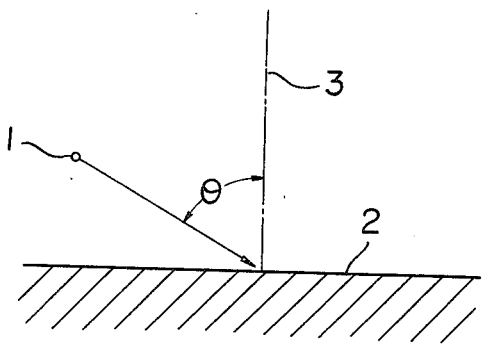
FIG. 1 shows a relation of a substrate and a tilt angle of metallic particles.
Figure 2:
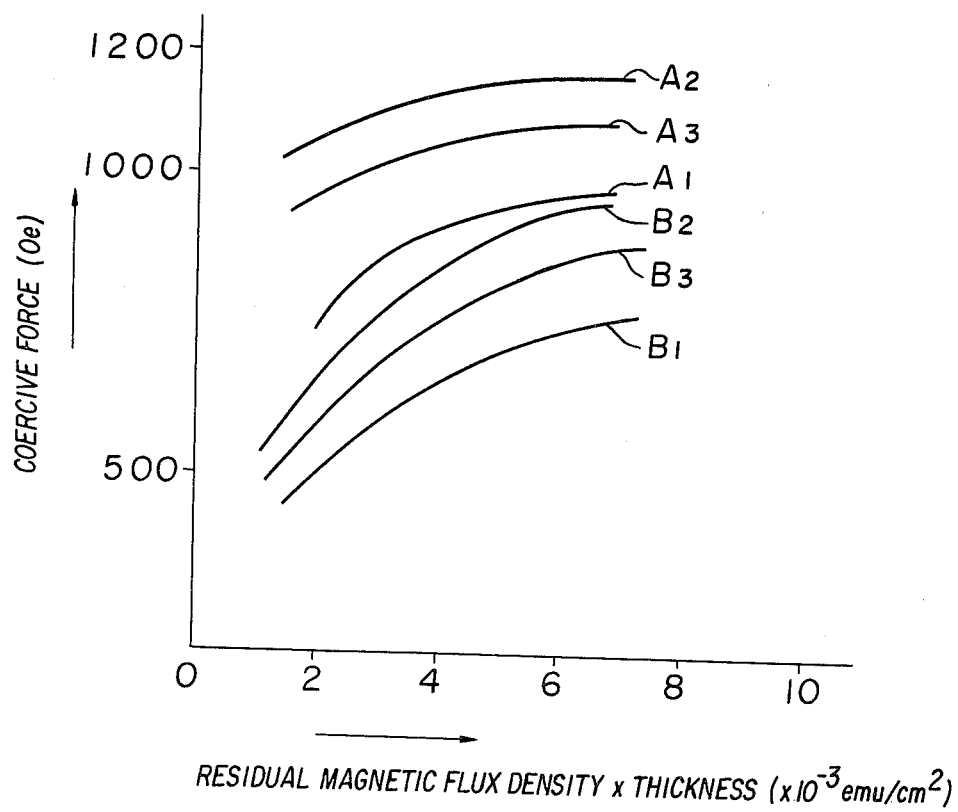
FIG. 2 is a graph showing a relation of coercive forces and residual magnetic flux density x thickness in magnetic characteristics of the present invention and reference.

Data of magnetic characteristics of Examples 1 to 3 and References 1 to 3 are shown in FIG. 2 wherein the residual magnetic flux density x thickness ($\times 10^{-3}$ emu/cm$^2$) is plotted on the abscissa and the coercive force (Oe) is plotted on the ordinate. The curves $A_1$ to $A_3$ show magnetic characteristic curves of the Samples $A_1$ to $A_3$ prepared by the processes of Examples 1 to 3; and the curves $B_1$ to $B_3$ show magnetic characteristic curves of Samples $B_1$ to $B_3$ prepared by the processes of References 1 to 3.

The magnetic characteristics were measured by vibrating sample type magnetometer (VSM) under the maximum magnetic field of 5000 gauss in the longitudinal direction of the substrate. The formulations of the Samples $A_1$ to $A_3$ and $B_1$ to $B_3$ were measured by EPMA to find substantially the same as the formulations of the evaporation base materials.

In comparison of the curve $A_1$, with the curve $B_1$, at the position of the same residual magnetization (residual magnetic flux density x thickness), the coercive force of the curve $A_1$ is higher than that of the curve $B_1$ for more than 200 (Oe). In the comparison of the curves $A_2$ with $B_2$ and the curves $A_3$ with $B_3$, the same results are found. The magnetic recording media having remarkably high coercive force can be obtained by the addition of chromium to a cobalt-nickel system.

In Examples 1 to 3, chromium is incorporated at an atomic percent of 4 based on total of cobalt and nickel. It is found that the effect of the improvement of the magnetic characteristics is imparted by the incorporation of chromium at an atomic percent of up to 5.

Figure 3:
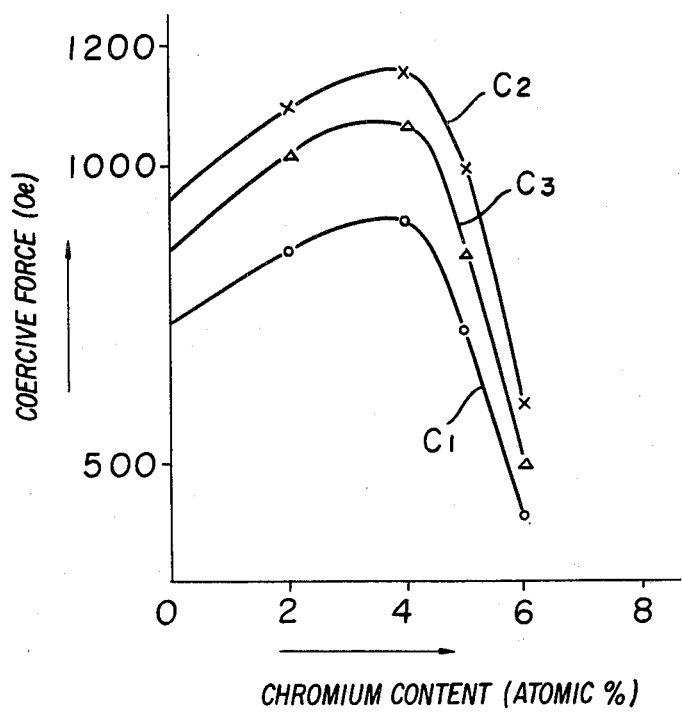
FIG. 3 is a graph showing a relation of coercive force and chromium contents.

Referring to FIG. 3, the problem will be illustrated. In FIG. 3, the content of chromium (atomic %) based on total of cobalt and nickel is plotted on the bascissa and the coercive force (Oe) is plotted on the ordinate.

The curve $C_1$ shows magnetic characteristics of the magnetic recording media prepared in accordance with the process of Example 1 except varying a content of chromium to 2, 4, 5 or 6 atomic percent based on the total of cobalt and nickel (atomic ratio of Co:Ni of 9:1).

The curve $C_2$ shows magnetic characteristics of the magnetic recording media prepared in accordance with the process of Example 1 except varying a content of chromium to 2, 4, 5 or 6 atomic percent based on the total of cobalt and nickel (atomic ratio of Co:Ni of 8:2).

The curve $C_3$ shows magnetic characteristics of the magnetic recording media prepared in accordance with the process of Example 1 except varying a content of chromium to 2, 4, 5 or 6 atomic percent based on the total of cobalt and nickel (atomic ratio of Co:Ni of 7:3).

The coercive forces of the curves $C_1$ to $C_3$ are the data at the position of the residual magnetization of $6 \times 10^{-3}$ emu/cm$^2$.

As it is found in FIG. 3, in the range of the content of chromium of 0 to 4 atomic percent, the coercive force increases depending upon an increase of the content of chromium to be maximum at a content of chromium of about 4 atomic percent. That is, the effect for increasing the coercive force is the maximum at a content of chromium of about 4 atomic percent. The coercive force increases for about 200 (Oe).

When the content of chromium is over 4 atomic percent, the effect for increasing the coercive force is reduced. In the range for up to 5 atomic percent of chromium, the coercive force can be more than the coercive force in the case of the cobalt-nickel alloy (content of chromium of 0). When the content of chromium is up to 5 atomic percent based on the total of cobalt and nickel, the effect for increasing the coercive force is given. In the formulation of cobalt and nickel, at various ratios, the magnetic characteristics are improved by incorporating chromium at up to 5 atomic percent.

As described above, in the magnetic recording media having a thin metallic magnetic layer on a non-magnetic substrate of the present invention, the thin magnetic layer contains at least cobalt, nickel and chromium whereby it provides the magnetic recording media having a thin metallic layer which have higher coercive force and superior magnetic characteristics in comparison with those of the conventional cobalt-nickel layer. In the range of up to 5 atomic percent of content of chromium based on the total of cobalt and nickel, remarkable effect for improving magnetic characteristics is imparted. Thus, in accordance with the present invention, it provides a magnetic recording medium having a thin metallic layer which is important in view of industrial and technical application.

We claim:

1. A magnetic recording medium which comprises a thin metallic magnetic layer on a non-magnetic substrate wherein said thin metallic magnetic layer is made of cobalt, nickel and chromium having a ratio of cobalt to nickel in a range of 9:1 to 7:3 and chromium content of up to 5 atomic percent based on the total of cobalt and nickel.

2. The magnetic recording medium according to claim 1 wherein a content of chromium is in a range of 0.5 to 5 atomic percent based on the total of cobalt and nickel.

UNITED STATES PATENT AND TRADEMARK OFFICE
CERTIFICATE OF CORRECTION

PATENT NO. : 4,418,126
DATED : November 29, 1983
INVENTOR(S) : Toshiaki Izumi et al It is certified that error appears in the above-identified patent and that said Letters Patent is hereby corrected as shown below:

-- [75] Please add the following inventor to the Letters Patent:

Seitoku Saito          Tokyo, Japan --

Signed and Sealed this

Seventh Day of February 1984

[SEAL]

Attest:

GERALD J. MOSSINGHOFF

Attesting Officer      Commissioner of Patents and Trademarks